United States Patent [19]

Gruber et al.

[11] Patent Number: 5,112,086
[45] Date of Patent: May 12, 1992

[54] COUPLING DEVICE FOR A CORRUGATED PIPE OR HOSE

[75] Inventors: Ernst Gruber, Hanau; Alfred Bamberg, Grosskrotzenburg, both of Fed. Rep. of Germany

[73] Assignee: FLEXA GmbH & Co. Produktion und Vertrieb KG, Hanau, Fed. Rep. of Germany

[21] Appl. No.: 717,929

[22] Filed: Jun. 20, 1991

[30] Foreign Application Priority Data

Jun. 25, 1990 [DE] Fed. Rep. of Germany ....... 4020171

[51] Int. Cl.$^5$ ................. F16J 15/00; F16L 39/00
[52] U.S. Cl. ............................... 285/86; 285/315; 285/319; 285/375; 285/903; 285/921
[58] Field of Search ............... 285/86, 315, 319, 375, 285/903, 921

[56] References Cited

U.S. PATENT DOCUMENTS

| | | | |
|---|---|---|---|
| 4,247,136 | 1/1981 | Fouss et al. | 285/903 X |
| 4,542,922 | 9/1985 | Grossauer | 285/903 X |
| 4,836,580 | 6/1989 | Farrell | 285/319 X |
| 4,923,227 | 5/1990 | Petty et al. | 285/319 |
| 4,989,905 | 2/1991 | Rajecki | 285/921 X |
| 5,042,844 | 8/1991 | Iida et al. | 285/921 X |

FOREIGN PATENT DOCUMENTS 0331116 9/1989 European Pat. Off. .

*Primary Examiner*—Michael F. Trettel
*Attorney, Agent, or Firm*—W. G. Fasse

[57] ABSTRACT

A coupling device for releasably connecting a corrugated member to the coupling device, has a radially outer housing, a radially inner operating sleeve and at least one locking claw forming part of the sleeve that is axially movable within the outer housing. The locking claw is accessible through an opening in the outer housing wall and its claw engages a corrugation ridge when a corrugated member is inserted into the operating sleeve. In the locked position a flange of the operating sleeve is axially spaced from the housing, whereby the claw rests against an edge of the opening and cannot be tilted radially outwardly about its hinge. In an unlockable position the flange of the sleeve contacts the housing and the claw can clear the opening edge to permit withdrawal of a corrugated member.

8 Claims, 3 Drawing Sheets

COUPLING DEVICE FOR A CORRUGATED PIPE OR HOSE

FIELD OF THE INVENTION

The invention relates to a coupling device for releasably connecting a corrugated member such as a pipe or hose having radially outwardly extending corrugation ridges to the coupling device. The corrugation ridges of the pipe or hose may extend circumferentially in parallel to each other around the pipe or hose or the corrugation ridges may extend around the hose or pipe in the manner of a helical threading.

BACKGROUND INFORMATION

Coupling devices for corrugated pipes or hoses having a pipe or hose wall with corrugation ridges therein, are known from European Patent Publication EP-0,331,116 (Farrell), published Sept. 6, 1989. The known coupling devices include a coupler housing, the main portion of which is approximately cylindrical. The coupler housing has an insert section at one end and a connector section at the other end. The insert section has a plurality of window type openings through each of which one coupling claw extends. The coupling claw forms part of a locking ring that carries axially extending fingers, each provided with a coupling or locking claw at its free end for locking a corrugated member in place. The connector section of the coupler housing has an outer threading for connecting to a suitable component, for example a junction box. A stop flange of the locking ring rests against an end of the coupler housing to limit an axially inward movement of the locking ring and its claws which extend axially in the coupler housing with some play, yet for permanently holding an end of a corrugated member in the coupling device in a zone defined by the window type openings.

For establishing the connection, a free end of a corrugated member is inserted into the locking ring to the desired depth. The ring is inserted into the coupler housing, whereupon the coupling claws snap into a groove between neighboring corrugation ridges, whereby the corrugated member is permanently locked in the housing because the claws can no longer be withdrawn from the locking position, even though some axial play is possible. Such permanent locking is a drawback of the known device even though the known device is rather simple in its construction.

OBJECTS OF THE INVENTION

In view of the foregoing it is the aim of the invention to achieve the following objects singly or in combination:

to modify a coupling device of the type described above in such a manner that a simple, easy, and repeatable locking and unlocking of a corrugated member in the coupling device is possible;

to achieve the foregoing without increasing the number of components needed for the repeated locking and unlocking; and to construct a locking device of the type described in such a way that a simple axial shifting of an operating sleeve brings one or more locking claws from a locked position into an unlockable position and vice versa.

SUMMARY OF THE INVENTION

The coupling device of the present invention is characterized in that the locking ring which carries the locking claws is constructed as an operating sleeve (5) having a stop flange (14) at one end and an inner ring (17) at the other end axially spaced from the stop flange (14), that said stop flange (14) is connected to said inner ring (17) by lands (16), and that webs (19) connected to said inner ring (17) carry at their free ends locking claws (20) extending toward said stop flange (14).

The operating sleeve according to the invention is inserted into a housing in which at least one window-type opening is provided for each locking claw. The construction of the operating sleeve (5) with an inner ring which carries the webs that in turn carry the locking claws makes it possible for the locking claws to yield into the respective opening in both instances, namely when the device is assembled and when a corrugated member, such as a corrugated pipe or hose, is withdrawn from the coupling device. Such a construction is realized by the fact that the operating sleeve is axially displaced into the housing. This feature permits the claws to yield radially outwardly. Contrary thereto, according to the above described prior art coupling device, an axial movement of the corrugated member applies a radially inwardly directed force component to the locking claws, whereby a release of the locking mechanism is not possible according to the prior art. On the other hand, the radial yielding of the locking claws according to the invention in a radially outward direction permits the release of the locking device Such release is possible due to the construction of the operating sleeve according to the invention. Yet another advantage according to the invention is achieved by the fact that the locking claws and the webs carrying the locking claws are exposed primarily to tension stress rather than to compression stress as is the case in the prior art when the member is withdrawn. Such tension loading of the locking claws and their mounting webs which function as hinges, facilitates the yielding of the locking claws into the window-type openings of the outer housing of the present locking device when the member is withdrawn.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
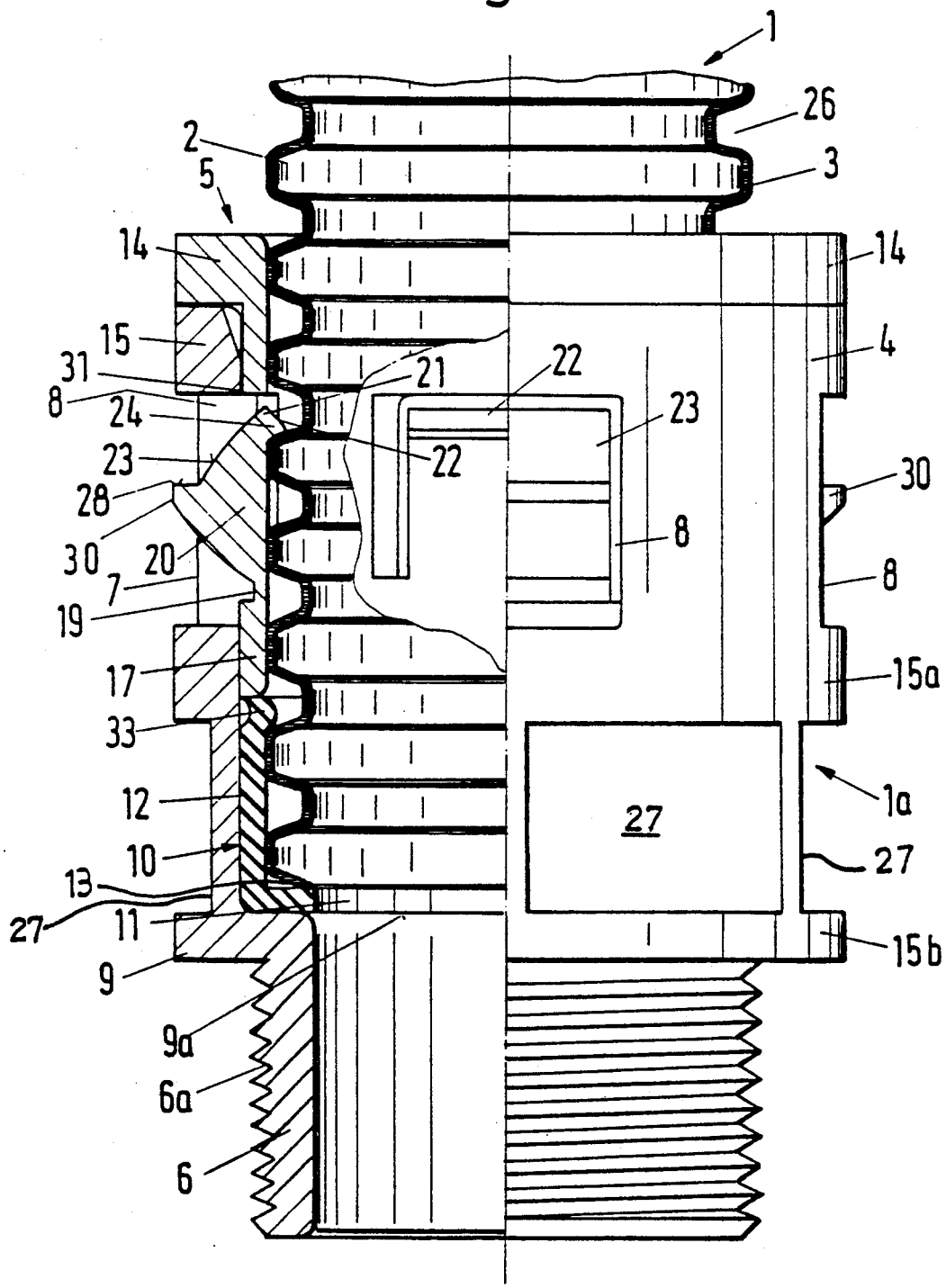
FIG. 1 illustrates on an enlarged scale, a coupling device according to the invention with the left half of the figure shown in section and the right half shown in a side view and illustrating the coupling device with its locking claws in an unlockable position, but still in engagement with a corrugated member inserted into the locking device.
Figure 2:
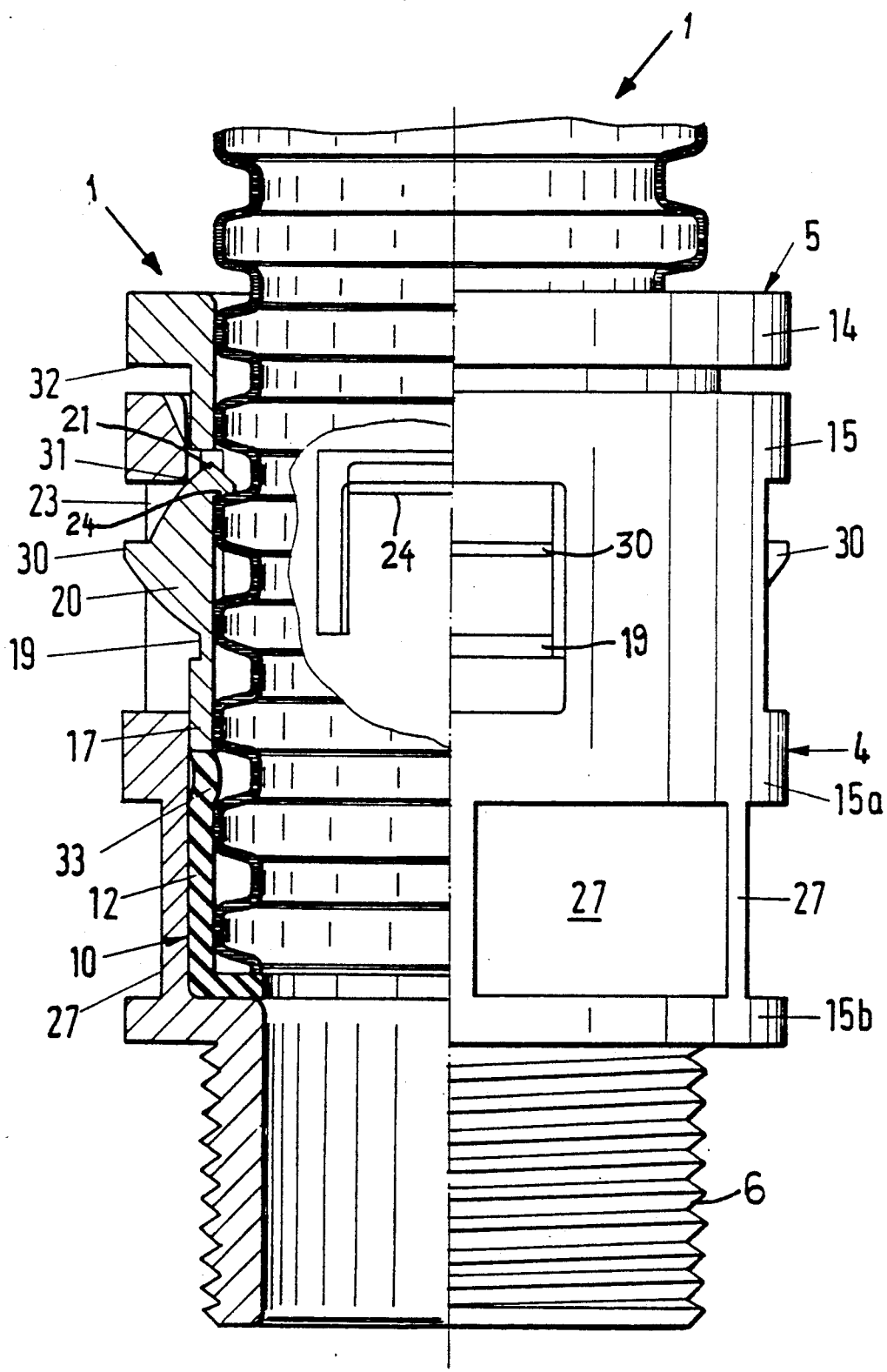
FIG. 2 is a view similar to that of FIG. 1, but showing the locking claws in a locked position.
Figure 3:
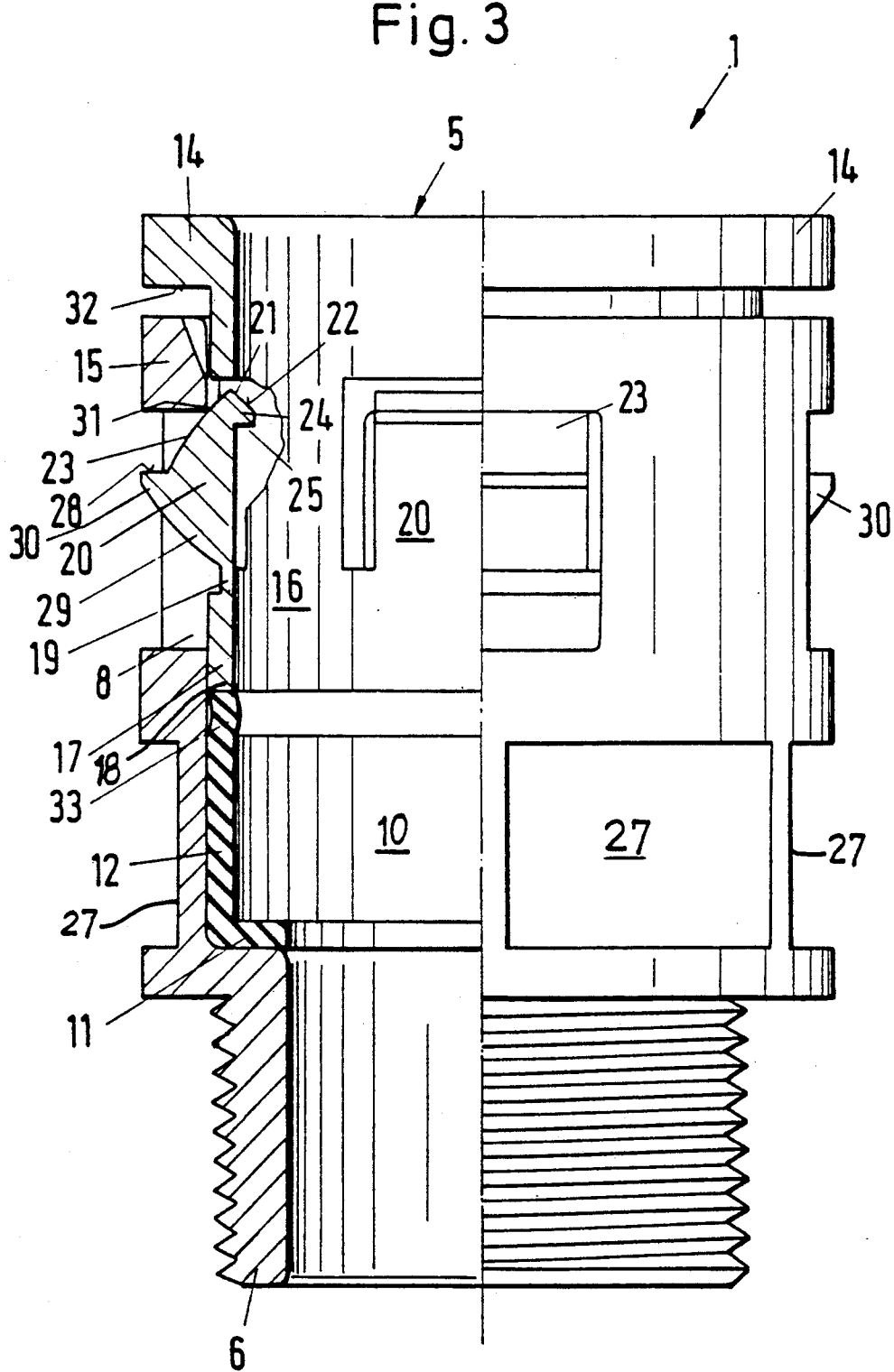
FIG. 3 is a view similar to that of FIG. 2, however, with the corrugated member removed.

Referring to FIGS. 1, 2, and 3 in conjunction, the present coupling device 1 for releasably connecting a corrugated member 2, such as a corrugated pipe or hose, to the coupling device, includes two, preferably 3, basic components. One component is the coupler housing 1a, the other component is the operating sleeve 5 axially movable inside the coupler housing, and the third component, which is preferably used, is an elastically yielding sealing ring 10. The corrugated member 2 has radially outwardly extending circumferential corrugation ridges 3 spaced from each other by corrugation grooves 26. The housing 1a is approximately cylindrical and has two sections. A connector section 6, for example, with an outer threading 6a is provided at one end of the coupler housing 1a. An insert section 4 is provided at the other end of the housing 1a. The sections 6 and 4 are interconnected by a shoulder 9 forming a ring surface 9a facing axially in a direction opposite to an insertion direction in which the corrugated member 2 is moved into the operating sleeve 5. The insert section 4 of the housing 1a has an end ring 15 at its end opposite to the shoulder 9 and reinforcing rings 15a and 15b. At least one window-type opening 8 is provided in the wall 7 of the insert section 4 between the rings 15 and 15a. One opening 8 is provided for each locking body 20 to be described in more detail below.

The elastically yielding sealing ring 10 has a cylindrical section 12 and a radially inwardly extending flange 11 resting on the axially facing surface 9a of the shoulder 9. Opposite the flange 11 the ring 10 has an axially facing elastically yielding bulging rim 33. The flange 11 of the sealing ring 10 is so dimensioned that the free end 13 of the corrugated member 2 can rest on the axially facing surface of the flange 11 when the corrugated member 2 is fully inserted into the operating sleeve 5 and into the sealing ring 10. Further, the inner diameter of the cylindrical section 12 of the sealing ring 10 is so dimensioned that the outer diameter of the corrugated member 2 is freely received in the sealing ring 10.

The operating sleeve 5 which is received for a limited axial sliding movement in the insert section 4 of the coupler housing 1a has an axial bore for holding an end portion of the corrugated member 2. The operating sleeve 5 comprises a stop flange 14 extending radially outwardly outside the coupler housing. The stop flange 14 cooperates with the end ring 15 at the inlet end of the housing section 4. The coupling sleeve 5 further comprises an inner ring section 17 extending axially in the insert section 4 of the coupler housing 1a. Axially extending lands 16 bridge an axial spacing between the inner ring section 17 and the stop flange 14 to connect the inner ring section 17 with the stop flange 14. The lands 16 are circumferentially distributed around the inner diameter of the stop flange 14 in such a way that they are located next to or between the openings 8. The free, axially facing end 18 of the inner ring 17 rests against the elastically bulging rim 33 of the sealing ring 10. Axially extending webs 19 forming elastic hinges, reach from the inner ring 17 toward the stop flange 14 between the lands 16. Each free end of a web or hinge 19 carries a locking body 20 equipped with a locking claw 24. The locking body 20 is so constructed that it functions for locking a corrugated member 2 inside the operating sleeve 5 and for also locking the operating sleeve 5 against withdrawal from the insert housing section 4.

The web portion next to the inner ring 17 of the webs 19 form a flexible bearing or joint to permit the locking body 20 to tilt either radially inwardly for locking the corrugated member 2 inside the locking device, or for releasing the corrugated member 2. The hinging function of the webs 19 is simply accomplished by reducing the cross-sectional area of these webs 19 between the ring 17 and the locking body 20. Preferably, the reduced cross-section portion of the webs 19 are located as close as possible to the inner ring 17.

Each locking body 20 has a free end 21 formed by two radially facing sloping surfaces 22 and 23. The sloping surface 22 faces approximately radially inwardly, while the sloping surface 23 faces approximately radially outwardly. The above mentioned claw 24 is formed below the radially inwardly sloping surface 22. The claw 24 faces axially in an insertion direction and opposite to a withdrawal direction of the corrugated member 2. In FIG. 1, for example, the withdrawal direction would be axially upwardly, while the insertion direction would be axially downwardly. The claw 24 reaches into the next available groove 26 of the corrugated member 2. In order to assume this position the operating sleeve 5 must be in the position shown in FIG. 1 with the stop flange 14 resting against the end ring 15 of the housing section 4. In this position the locking body 20 is free to tilt radially inwardly or radially outwardly As shown, the locking body 20 is in an unlockable position because the free end 21 of the body 20 can still clear an inner edge 31 of the housing end ring 15. When a corrugated member 2 is inserted into the operating sleeve 5 the free end 13 of the member 2 engages the inwardly slanting surface 22 of the locking body 20 to tilt the body 20 radially outwardly into the opening 8. Thus, the member 2 can be pushed axially inwardly past the claw 24 until the free end 13 of the member 2 rests on the axially upwardly facing surface of the flange 11 of the sealing ring 10.

The radially outwardly sloping surface 23 merges into an axially upwardly facing stop surface 28 of the locking body 20 to form a locking projection 30 which prevents the withdrawal of the operating sleeve 5 from the housing section 4 as will be described below.

Referring to FIG. 2, which illustrates the locked position of the locking body 20 with its claw 24, the spring elastic sealing ring 10 is so dimensioned with regard to its axial length, that it tends to bias the operating sleeve 5 with the outwardly slanting surfaces 23 of the locking body 20 against an inner edge 31 of the respective window-type opening 8. In this position the axially facing surface 32 of the stop flange 14 of the operating sleeve 5 is axially spaced from the housing end ring 15 of the insert section 4 of the housing 1a. Even in the position shown in FIG. 2, the upper end of the cylindrical section 12 of the ring 10 forms a somewhat compressed bulge 33 reaching radially inwardly.

In operation, when a free end 13 of a corrugated member 2, is pushed through the stop flange 14 into the operating sleeve 5, the stop flange 14 will initially rest against the housing end ring 15 as shown in FIG. 1. In this position the free end 13 engaging the inwardly slanting surface 22 of the locking body 20 tilts the latter radially outwardly as the corrugated member moves axially against the biasing force of the spring elastic ring 10 until the locking body or bodies 20 are pushed into the openings 8 so that the corrugation ridges 3 and grooves 26 can pass the locking claw 24 until the free end 13 rests on the flange 11 of the sealing ring 10. As soon as the inserting force is released and no longer effective on the locking body 20, the claw 24 will engage in a groove 26 resting with its axially downwardly facing surface 25 on a ridge 3 of the corrugated member 2, thereby providing the lockable engagement between the claw 24 and the member 2. In this position the member 2 cannot itself pull out of the connecting device without an external force. Further, the elastic biasing force of the sealing ring 10 pushes the operating sleeve 5 axially upwardly into the position shown in FIGS. 2 and 3, thereby positively preventing a counterclockwise rotation of the locking body 20 because its surface 23 rests against the edge 31. At this point, the stop flange 14 is spaced from the ring 15 as mentioned.

For again releasing the connection between the claws 24 and the member 2, the operating sleeve 5 is pushed axially inwardly against the biasing force of the sleeve 10 until the free end 21 of the locking body 20 clears the edge 31 of the opening 8 to assume the unlockable position shown in FIG. 1. In this position it is now possible to simply withdraw the member 2 with a forceful pull in the withdrawing direction, whereby the slanted surfaces of the ridges 3 of the member 2 tilt the locking bodies 20 radially outwardly into the openings 8. Thus, for insertion and withdrawal the operating sleeve 5 is in the position shown in FIG. 1, referred to as the unlockable position, while in the locked condition the sleeve is pulled axially outwardly and held there by the biasing force of the elastically yielding sealing ring 10.

The housing section 4 of the housing 1a may be provided between the rings 15a and 15b with flat surfaces 27 for cooperation with a tool.

The stop surface 28 of the projection 30 of the locking body 20 will prevent the withdrawal of the operating sleeve 5 when the member 2 is pulled out of the device. For this purpose the surface 28 will engage the edge 31 of the ring 15.

Although the invention has been described with reference to specific example embodiments it will be appreciated that it is intended to cover all modifications and equivalents within the scope of the appended claims.

What we claim is:

1. A coupling device for releasably connecting a corrugated member having radially outwardly extending corrugation ridges therein to said coupling device, comprising a coupler housing, a connector section (6) at one end of said coupler housing, an insert section (4) at the opposite end of said coupler housing, said insert section having at least one opening (8) through a wall of said insert section (4), an operating sleeve (5) received for an axial sliding movement in said insert section of said coupler housing, said operating sleeve (5) having an axial bore for holding an end portion of said corrugated member, said operating sleeve (5) comprising a stop flange (14) extending outside said coupler housing, inner ring means (17) extending axially in said insert section of said coupler housing and at a axial spacing from said stop flange (14), axially extending lands (16) bridging said axial spacing and connecting said inner ring means (17) with said stop flange (14), said lands (16) being spaced from each other at circumferential spacings between neighboring lands, locking claw means (20) for locking onto one of said corrugation ridges when said end portion of a corrugated member is received in said axial bore of said operating sleeve (5), hinge means (19) connecting said claw means (20) to said inner ring means (17) between said axially extending lands (16) in said circumferential spacings so that said claw means are operable through said a least one opening when said claw means are in an unlockable position, and wherein an axial movement of said operating sleeve (5) brings said claw means (24) into a locked position and into an unlockable position, whereby said claw means can be tilted substantially radially outwardly when said claw means are in said unlockable position by axially pulling said corrugated member for an unlocking operation, and whereby said claw means are locked against an axially outward tilting movement when said claw means are in said locked position.

2. The coupling device of claim 1, wherein said claw means comprises a claw body (20), said hinge means (19) connecting one end of said claw body (20) to said inner ring means (17), said claw body further having a free end (21) opposite said one end, said free end (21) including a locking claw (24) having a first radially inwardly facing slanted surface (22) and a locking surface (25), said claw body (20) further having a second radially outwardly facing slanted surface (23), said first slanted surface (22) cooperating with said corrugated member for pushing said claw body (20) radially outwardly when said corrugated member is being inserted into said axial bore of said operating sleeve (5), said second slanted surface (23) cooperating with an edge of said opening (8) in said housing insert section (4) to hold said claw body in said locked position.

3. The coupling device of claim 2, wherein said claw body (20) further comprises a radially outwardly extending axially facing stop surface (28) for preventing withdrawal of said inner ring means from said insert section (4), said second slated surface (23) merging into said axially facing stop surface (28).

4. The coupling device of claim 2, wherein said claw (24) extends substantially radially inwardly, and wherein said locking surface (25) faces in an axial insertion direction of said claw body (20) for engaging one of said corrugation ridges against withdrawal of said corrugated member in a withdrawal direction opposite to said insertion direction.

5. The coupling device of claim 2, wherein said locking claw (24) is directed substantially radially inwardly, and wherein said hinge means (19) are so axially spaced from said locking claw (24) that said claw body (20) is tiltable radially outwardly in response to a force tending to withdraw said corrugated member from said operating sleeve when said operating sleeve is in said unlockable position in which said stop flange (14) of said operating sleeve (5) contacts an axially facing end of said coupler housing.

6. The coupling device of claim 1, wherein said connector section (6) and said insert section (4) of said coupler housing are connected to each other at a shoulder (9) extending radially inwardly, said shoulder (9) forming a ring surface facing in an axial direction, said coupling device further comprising a spring-elastic sealing ring (10) resting with one end on said axially facing ring surface, said inner ring means (17) of said operating sleeve (5) resting with its inner end against said spring-elastic sealing ring (10) which biases said inner ring means (17) and thus said operating sleeve (5) into said locked position in an axially outward direction.

7. The coupling device of claim 1, wherein said hinge means (19) are located in said claw means (20) close to an inner edge of said opening (8) away from said stop flange (14).

8. A coupling device for releasably connecting a corrugated member having radially outwardly extending corrugation ridges therein to said coupling device, comprising a housing with at least one lateral opening therein, an operating sleeve (5) axially movable in said housing, said operating sleeve (5) having at least one radially extending stop flange cooperating with an axially facing end of said housing, said operating sleeve further having at least one locking claw tiltable in a radial direction in said lateral opening of said housing for locking said corrugated member against axial withdrawal when said operating sleeve is in one position and for releasing said corrugated member when said operating sleeve is in another axial position in said housing.

* * * * *